Feb. 17, 1970          H. KELCH          3,495,740

OPERATING ARRANGEMENT FOR A COUNTER CONTROLLED DEVICE

Filed June 13, 1968          2 Sheets-Sheet 1

INVENTOR
Heinz KELCH

By:
Michael S. Striker
Attorney

Feb. 17, 1970 H. KELCH 3,495,740
OPERATING ARRANGEMENT FOR A COUNTER CONTROLLED DEVICE
Filed June 13, 1968 2 Sheets-Sheet 2

INVENTOR
Heinz KELCH

By:
Michael S. Striker
Attorney

United States Patent Office 3,495,740
Patented Feb. 17, 1970

3,495,740
OPERATING ARRANGEMENT FOR A COUNTER CONTROLLED DEVICE
Heinz Kelch, Villingen, Germany, assignor to Kienzle Apparate G.m.b.H., Villingen, Black Forest, Germany
Filed June 13, 1968, Ser. No. 736,716
Claims priority, application Germany, June 14, 1967, K 62,558
Int. Cl. B67d 5/30; G01f 11/32
U.S. Cl. 222—20
10 Claims

ABSTRACT OF THE DISCLOSURE

A spring biassed valve is stepwise closed when a preset counter measuring fluid discharged by the valve approaches its zero position. A stepped cam on the lowest order wheel of the counter controls a linkage connected with the spring biassed actuating means of the valve and includes a connecting lever urged by the spring biassed actuating means to turn in one direction, and a compensating spring urging the lever in the opposite direction so that the pressure on the cam is reduced.

BACKGROUND OF THE INVENTION

The present invention relates to an apparatus which is particularly suited for discharging a preset and measured amount of liquid. In an apparatus of this type, the operator sets the counter to the volume to be dispensed, and the counter is driven by the dispensed fluid to return to its zero position in which the valve is closed. It is desired to close the valve, or a corresponding shiftable device, in several steps. For this purpose, a cam having a plurality of cam lobes of different height is connected to the counter wheel of the lowest order, and is sensed by feeler means which through a linkage effect stepwise closing of the valve when the cam lobes are successively sensed. The spring of the valve means which tends to close the movable valve member acts on manually operated actuating means for the valve, and the spring force is transmitted through the linkage to the feeler means by which the cam means are sensed.

In apparatus of this type, it is desirable that the cam follower of the feeler means engages the cam with the smallest possible force which still assures accurate and reliable function. High pressure of the cam follower on the cam which is connected to a counter wheel, produces a friction force which has to be overcome by the fluid which drives the counter. High pressure of the cam follower on the cam, and resulting high friction, detrimentally influence the accuracy of the counter.

The turning moments or torques required for operating the valve member which is biassed by a strong spring are generally substantially greater than desirable for producing the friction between cam follower and cam. The feeler mechanism for the cam, and the mechanism for operating the valve are therefore separated so that the turning moment produced by the strong valve spring does not directly act on the feeler means for the cam.

The required separation is obtained by a stepped member cooperating with a part of the feeler means which is disposed so that the force transmitted from the valve spring is taken up by a bearing. A separate spring is provided for urging the feeler means into engagement with the cam.

However, if the turning moment acting on the stepped member is comparatively great, the frictional resistance is increased in the linkage so that the spring force acting on the feeler means has to be increased correspondingly, whereby greater pressure is exerted on the cam means by the cam follower of the feeler means.

Apparatus of this type is not only used for controlling valves of different size controlling the flow of fluids, but also for electric switches controlling electric current measured by a counter which is part of the meter. Due to different turning moments and forces of such a variety of controlled devices, it has not been possible to use a single standard operating arrangement of this type for a wide variety of controlled devices producing forces of very different magnitude.

SUMMARY OF THE INVENTION

It is one object of the invention to improve operating arrangement for shiftable devices, and to provide an operating arrangement capable of controlling shiftable devices, such as valves and switches, which require the control of different shifting forces.

Another object of the invention is to provide an operating arrangement for a shiftable device having a spring in which the spring force does not act directly on the cam follower sensing a cam connected with a counter correlated with the shiftable device.

Another object of the invention is to provide an operating arrangement for controlling the forces of a spring acting on the operating member of a shiftable device, or on its actuating means.

In accordance with the invention, the spring biassed operating member of the shiftable device, for example the valve member of a valve, or an actuating means connected with the same, transmits the force of a spring to a pivotally mounted connecting lever which is urged to turn in one direction, and a compensating spring acts on the lever to turn the same in the opposite direction with a lesser turning moment.

One embodiment of the invention comprises counter means including a rotary cam having different cam lobes; feeler means including a cam follower for sensing the cam lobes, and an abutment part; a stepped member turnable between a plurality of abutting position in which stepped engaging portions thereof, respectively abut the abutment part; a shiftable device, such as a valve, including a movable operating member, actuating means for moving the operating member to a plurality of displaced positions, and a spring for moving the operating member and the actuating means to an end position, for example, for closing the valve; connecting mounted on stationary supporting pivot means for turning movement about an axis between a plurality of operative positions and being connected with the stepped member for turning the same between the abutment positions, the connecting means having a plurality of abutment faces respectively engaged by the actuating means in the displaced positions under the action of the spring; and compensating spring means connected with the connecting means and exerting on the same a turning moment which is less than the moment produced by the spring of the shiftable device. In this manner, the pressure and friction between the cam of the counter means and the cam follower of the sensing means are reduced.

The counter means is first set to a desired volume, for example a desired volume of a liquid controlled by the valve. The actuating means of the valve member are operated to place the same in the displaced position in which the valve is fully opened. The discharged fluid operates the counter, and when the same approaches its zero position, the feeler means and the abutment part thereof are operated by the cam lobes to cause engagement between the stepped engaging portions of the stepped member with the abutment part of the feeler means, while the connecting means turns and different abutment faces thereof are engaged by the actuating means, effecting gradual closing of the valve until its operating member arrives in the closing end position.

The torque transmitted to the cam follower of the feeler means is reduced due to the action of the compensating spring means of the connecting means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 2:
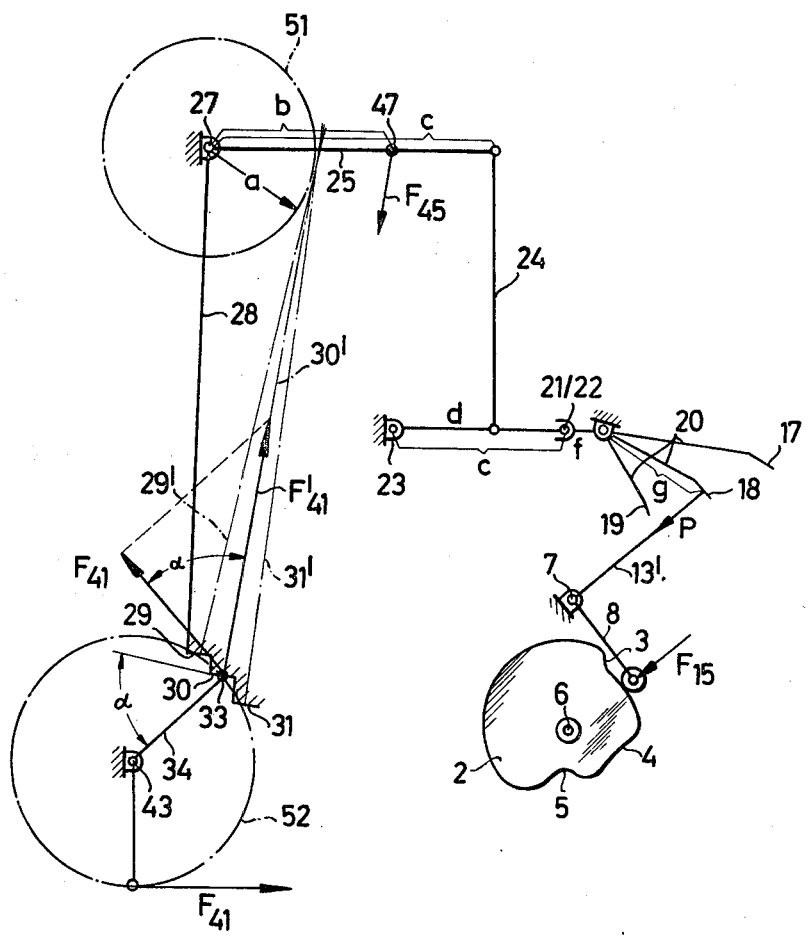
FIG. 2 is a schematic and diagrammatic view illustrating the forces acting on the parts of the mechanism in the form of vectors.

A counter or register having a plurality of ordinal counter wheel is schematically represented by the counter wheel 1 of the lowest order. All counter wheels, and a cam 2 secured to the counter wheel 1 of the lowest order, are turnable on a shaft 6. A cam 2 has two radial lobes 3 and 4 and a recess 5 connected with lobe 3 by a circular cam portion, as best seen in FIG. 2. Feeler means 10 are mounted on a shaft 7 whose axis is parallel to the axis of shaft 6 and include a cam follower arm 8 with a roller 9 cooperating with the lobes of cam 2. When counter wheel 1 is in the zero position, cam follower roller 9 engages the recessed cam portion 5, and during turning of the counter wheel, lobes of different height successively engage cam follower roller 9 to turn the feeler means 10 to different angular positions. A spring 15 is connected to arm 14 of feeler means 10 and turns the cam follower 8, 9 into engagement with cam 2. Another arm 11 of the feeler means carries a pin 11′ on which arm 12 of a detent lever 13 abuts under the action of the spring 12′. Detent lever 13 is turnable on shaft 7 and has another arm 13′ carrying an abutment pin 16.

Abutment pin 16 cooperates with stepped engaging portions 17, 18, 19 of a stepped member 20 which is mounted for turning movement on shaft 6. Stepped member 20 has a gear segment portion 21 meshing with a gear segment 22 mounted on a stationary pivot 23 for turning movement.

One end of a link 24 is pivotally connected with gear segment 22, and the other end is pivotally connected with the shorter arm 25 of an angular lever 26 which is mounted on a stationary pivot 27 supported by a frame, not shown, and has a longer arm 28 having a plurality of stepped abutment faces 29, 30 and 31, and releasing face 32. Faces 29 to 32 of connecting lever 26 cooperate with a stud 33 on an angular actuating lever 34 having at its other end, a slot 36 receiving a slide portion 35 of the operating member 39 of valve means 37 which include a valve casing 38, a valve member 40, a casing 38, and a spring acting on the valve member 40 urging the same into a closing end position, illustrated in FIG. 1, in which stud 33 is in contact with the releasing face 32 of connecting lever 26. Actuating lever 34 is connected by shaft 43 to a manually operated lever 44 which can be turned together with actuating member 34 for moving operating member 39 with valve member 40 against the action of spring 41 to a position in which stud 33 abuts abutment face 31 whereby the valve is fully opened. When stud 33 engages one of the abutment faces 29, 30, 31, the force of spring 41, acting toward the right as viewed in FIG. 1 on actuating lever 34, is transmitted by stud 33 to arm 28 of connecting lever 26 whereby a turning moment acting in counter-clockwise direction is applied to connecting means 26.

Figure 1:
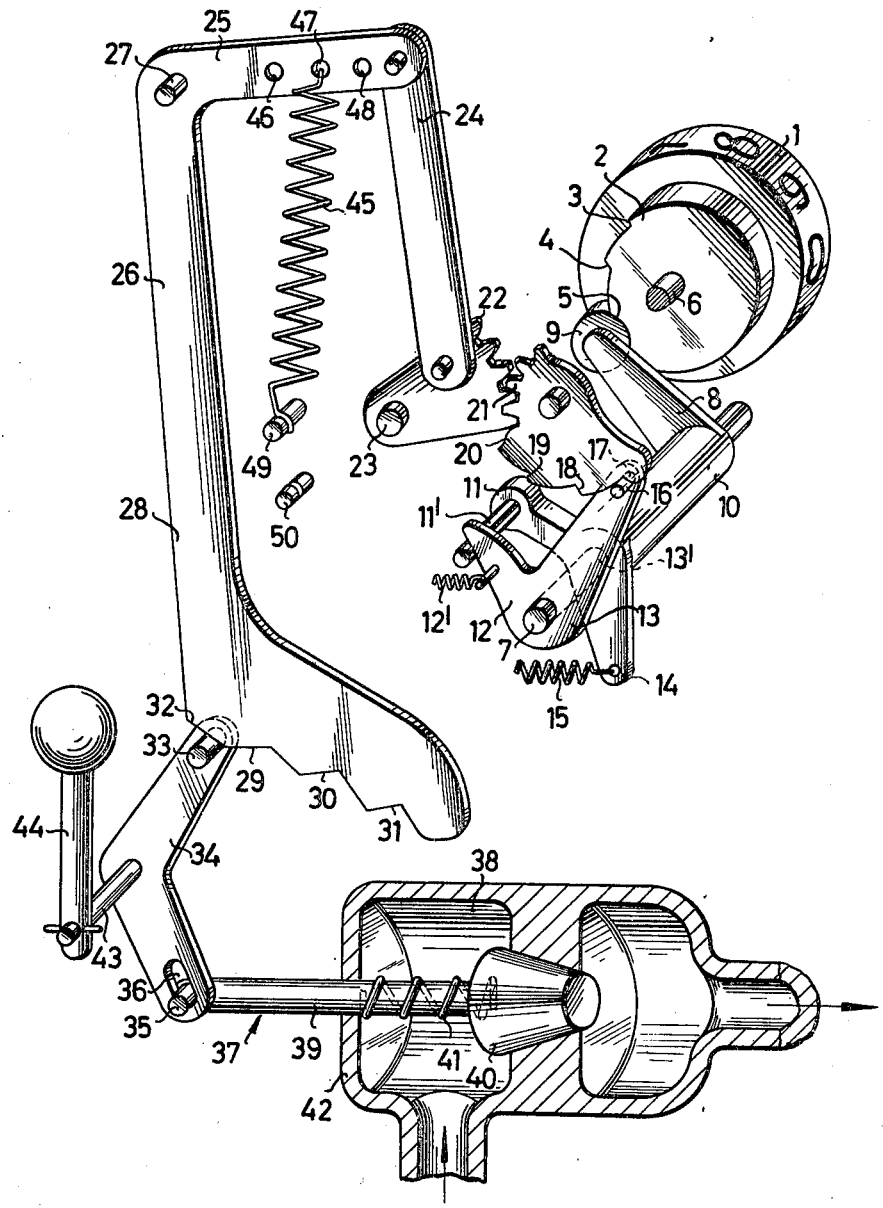
FIG. 1 is a fragmentary schematic perspective view illustrating an embodiment of the invention applied to a valve, and illustrating the arrangement in a position in which the valve is closed.

A compensating turning moment acting in clockwise direction as viewed in FIG. 1, is exerted on connecting means 26 by compensating spring 45 the upper end of which is secured to a bore 47, while the lower end of spring 45 can be attached to one of the stationary studs 49, 50 which are secured to a stationary frame, not shown. The spring force of spring 45 is varied by attaching the end of the spring either to stud 49 or to stud 50, while the turning moment exerted by spring 45 can be varied by securing the upper end of spring 45 either to hole 46 or to hole 48 in the shorter arm 25 of the connecting lever 26.

As shown in the diagram of FIG. 2, the abutment faces 29, 30, 31 of arm 28 have such a position that central perpendicular lines 29′, 30′ and 31′ are tangents on an auxiliary imaginary circle 51 having the radius $a$. Due to this arrangement, spring 41 transmits through angular lever 34 and stud 33 to any one of abutment faces 29, 30, 31, a force $F'_{41}$ producing a counter-clockwise turning moment $aF'_{41}$ on connecting lever 28, which is opposed by the clockwise compensating movement $bF_{45}$ produced by compensating spring 45.

It is not necessary that the abutment faces 29, 30, 31 have the same directional relation to circle 51, and if the respective forces are differently directed, the characteristics of the springs 41 and 45 can be considered and compensated.

The releasing face 32 of arm 28 has such a direction that in the closed position of the valve, face 32 is substantially parallel to a tangent on the imaginary circle 52 which passes through the centers of the abutment faces 29, 30, 31. Due to the tangential direction of releasing face 32, there is no resistance against movement of stud 33 with actuating lever 34 out of the position shown in FIG. 1. Arm 28 of connecting means 26, rests with releasing face 32 on stud 33 under the action of spring 45 and is thus secured in the position of FIG. 1. The spring force $F_{41}$ acting on slot 36 of actuating lever 34 produces on stud 33 a tangential force $F_{41}$ defining an angle $\alpha$ with the force $F'_{41}$.

The engaging portions 17, 18 and 19 of the stepped segment shaped member 20, which cooperates with the abutment part 16 of detent lever 13, are disposed so that central perpendicular lines thereon pass through the axis of shaft 7 so that the force component acting on arm 13′ is taken up by the bearing, not shown, of shaft 7. The spring 15 which acts on feeler means 10 is therefore required for holding cam follower 8 and roller 9 in engagement with the periphery of cam 2.

It is possible to omit spring 15, and to dispose the engaging portions 17, 18 and 19 in such a position that central perpendicular lines thereon do not intersect with the axis of shaft 7, but pass the same on the right, as viewed in FIG. 1, so that a turning moment in clockwise direction is produced on feeler means 10 for urging the cam follower 8, 9 into engagement with the cam.

FIG. 2 shows the three positions of stepped member 20 schematically and illustrates a force P produced, for example, by engaging portion 18 and passing through the shaft 7. Feeler means 10 are schematically represented by cam follower arm 8 in FIG. 2, and the force $F_{15}$ produced by the spring 15 is shown to act on cam follower roller 9 on arm 8.

The apparatus shown in FIGS. 1 and 2 includes a valve 37 controlling the flow of a liquid, for example a fuel such as gasoline, from a tank to a discharge nozzle which is used for filling the tank of a car. As the liquid is discharged, it drives a flow meter by which counter 1 is driven.

When the apparatus is not used, the counter wheels are in the zero position. The lowest cam portion 5 is engaged by cam follower roller 9 when the counter wheel 1 of the lowest order is in the zero position. Spring 41 of valve means 37 holds valve member 40 to a position closing valve 37. In this position of the feeler means 10, abutment part 16 is held by parts 10, 11, 11', 12, 13 and 13' in its outermost position turned in clockwise direction so that engaging portion 17 abuts abutment part 16. Since stepped member 20 is connected by gear segments 21, 22, link 24, connecting means 26, face 32, stud 33, actuating lever 34 and operating member 39 with the spring loaded member 40, it is evident that valve 37 is closed by spring 41 when the counter is in the zero position.

In other words, when the counter indicates zero, roller 9 must engage cam portion 5, engaging portion 17 abuts abutment part 16, releasing face 32 engages stud 33, and valve member 40 closes the valve and interrupts the flow of liquid.

A customer or other operator sets the counter to the desired amount of liquid, for example 1837 liters. Cam means 2 turn with the counter means so that rollers 9 are located on the cam portion having the greatest radius. Pin 11' is turned in counter-clockwise direction and releases arm 12 of detent lever 13 which is held in its previous position by engaging portion 17 acting on abutment part 16.

To start the discharge of liquid, the customer or operator turns handle lever 44 with actuating lever 34 in clockwise direction against the force of spring 41 until stud 33 engages abutment face 31. During this operation, stud 33 moves away from face 32, and lever 26 is urged by spring 45 to turn in clockwise direction until abutment face 31 engages stud 33. When handle lever 44 is released, spring 41 urges actuating lever 34 to turn in counter-clockwise direction, but since stud 33 abuts the abutment face 31, actuating lever cannot turn in counter-clockwise direction, but a force $F'_{41}$ is exerted on abutment face 31 which produces a turning moment in counter-clockwise direction on connecting lever 26, exceeding the moment produced in clockwise direction by spring 45.

Since the valve is now held in the open position due to the blocking of actuating lever 34, liquid flows through the valve casing 42, 38 and drives the preset counter 1 through a flow meter, not shown. The drive is subtractive so that the volume of 1837 liters previously set on the counter, is gradually reduced in accordance with the discharged volume of liquid. The counter rotates toward a zero position. First, the counter wheel of the highest set order will turn to zero position then the next and so forth until only 9 liters are to be discharged so that all counter wheels of the higher orders are in zero position, and the counter wheel of the lowest order indicates 9.

Assuming that valve means 37 is to be throttled to a first position when only 8 liters are to be dispensed, and again throttled when only 3 liters are to be dispensed, the cam lobes 3 and 4 register in circumferential direction with digits 8 and 3 of counter wheel 1 of the lowest order.

When counter wheel 1 indicates 9, roller 9 is still located on the cam lobe having the greatest radius, and valve 37 is fully opened. Abutment part 16 abuts engaging portion 20, and stud 33 is pressed by valve spring 41 against abutment face 31. When counter wheel 1 indicates the digit 8, cam follower roller 9 is urged by spring 15 to engage cam portion 3 so that pin 11' is displaced, and displaces detent lever 13 with abutment part 16 one step in clockwise direction so that the stepped member 20 is free to turn to a position in which the next following engaging portion 19 is engaged by abutment part 16. During this operation, connecting lever 26 is permitted to turn in counter-clockwise direction so that stud 33 slides into engagement with abutment face 30. A corresponding shifting of the parts takes place when counter wheel 1 indicates the digit 3.

The next stepwise movement is carried out when the counter wheel 1 returns to zero position, and cam follower roller 5 engages the lowest cam portion 5.

In the folowing table, the positions of operative parts of the apparatus are indicated.

| Valve 37 | Indication counter wheel | Cam portion engaged by roller 9 | Engaging portion engaged by part 16 | Abutment face engaged by stud 33 |
|---|---|---|---|---|
| Open | 9 | maximum | 20 | 31 |
| ⅔ open | 8 | 3 | 19 | 30 |
| ⅓ open | 3 | 4 | 18 | 29 |
| Closed | 0 | 5 | 17 | 32 |

When the counter wheel indicates 9, 8, 3 or 0 liters, the valve is stepwise first throttled and then closed, while roller 9 engages different cam portions of cam 2, starting at the highest lobe. At the same time, abutment part 16 respectively engages engaging portions 20, 19, 18 and 17, and abutment faces 31, 30, 29 and facing face 32 are successively engaged by stud 33.

When stud 33 moves along the imaginary circle 52 during the opening of the valve, connecting means 26 is turned by spring 45 in clockwise direction so that gear segment 22 is turned in clockwise direction and turns stepped member 21 in counter-clockwise direction so that due to the fact that the engaging portions 17, 18 and 19 have successively smaller radii in counter-clockwise direction, the abutment part 16 can move with lever 13 in counter-clockwise direction under the action of spring 12' to engage the next following engaging portion 18, or 19.

Upon release of the actuating means 44, 34 by the operator, spring 41 is effective to produce a turning moment in counter-clockwise direction on connecting means 26 which would be transmitted to roller 9 to press the same against the cam. Due to the compensating spring 45, whose spring force can be selected and adjusted by the adjusting holes 46, 47, 48 and the adjusting pins 49, 50, the turning moment in counter-clockwise direction is almost completely compensated so that the force acting on detent lever 13 is reduced whereby the friction between the engaging portions 17, 18, 19 of stepped member and the abutment part 16, and also the friction between roller 9 and cam 2 is reduced and permits accurate operation of the counter.

As shown in FIG. 2, the abutment faces 29, 30 and 31 have such a direction that central perpendicular lines 29', 30' and 31' are tangents on the imaginary circle 51 and produce the same turning moment. When stud 33 moves from abutment face 31 to abutment faces 30 and 29, the angle $\alpha$ between the fourth vectors $F_{41}$ and $F'_{41}$ is varied. Since $F'_{41}$ is equal to $F_{41}/\cos \alpha$, and the counter-clockwise moment on connecting means 26, $M_{26}$ is equal to $F'_{41} a$, a different turning moment is produced by each abutment face 29, 30, 31, assuming $a$ to be constant. For a constant compensating spring force $F_{45}$, different values for the force P, which acts on detent lever 13' would result during the cooperation of abutment part 16 with engaging portions 17, 18 and 19 of stepped member 20.

The force P can be calculated as follows:

$$P = (F'_{41}a - F_{45}b) \cdot \frac{d \cdot f}{c \cdot e \cdot g}$$

wherein $a$ is a radius of circle 51, and $b$, $c$, $d$, $e$, and $g$ are lever arms shown in FIG. 2.

In order to avoid the disadvantage of different forces P acting on lever 13, it is advantageous to dispose the abutment faces 29, 30, 31 of connecting means 26 in such a position that the angle between the force vectors $F_{41}$ and $F'_{41}$ remains constant. For further approximating a constant force P, the characteristics of springs 41, 45 and 12', and also the variation of the length of lever arm $g$ of stepped member 20, and the different distances of the engaging portions 17, 18 and 19 from the axis of shaft 6 have to be considered.

The force $F_{15}$ produced by spring 15 and acting on cam follower lever 8 is the force with which cam follower roller 9 engages the cam 2 when the apparatus is in a static condition, and this force is required in a dynamic condition of the apparatus to slide the abutment part 16 of lever 13, 13' under the engaging faces 17, 18, 19, overcoming the friction betwen the parts.

It will be understood that each of the elements described above, or two or more together, may also find a useful application in other types of operating arrangements for stepwise actuated shiftable devices differing from the types described above.

While the invention has been illustrated and described as embodied in an operating arrangement for a counter controlled valve, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Operating arrangement for a counter controlled device, comprising, in combination, counter means including rotary cam means having a plurality of different cam portions; feeler means including a cam follower for sensing said cam portions, and an abutment part; a stepped member having a plurality of stepped engaging portions and being turnable between a plurality of abutting positions in which said engaging portions, respectively, abut said abutment part; a shiftable device including a movable operating member, actuating means for moving said operating member to a plurality of displaced positions, and a spring for moving said operating member and said actuating means to an end position, said counter being operated in said displaced positions so that said cam means turns; supporting means; connecting means mounted on said supporting means for turning movement about an axis between a plurality of operative positions, and being connected with said stepped member for turning the same between said abutment positions, said connecting means having a plurality of abutment faces respectively engaged by said actuating means in said displaced positions under the action of said spring whereby a first turning moment acts on said connecting means in one direction of rotation for turning the same to said operative positions when said actuating means moves between said displaced positions; and compensating spring means connected with said connecting means and exerting on the same in the opposite direction of rotation a second turning moment which is less than said first turning moment and partly compensates the same whereby pressure and friction between said cam means of said counter means and said cam follower of said sensing means are reduced.

2. Operating arrangement as claimed in claim 1 and including means for adjusting said compensating spring means for varying said second turning moment.

3. Operating arrangement as claimed in claim 1 wherein said connecting means includes a connecting lever having an arm, said arm having a plurality of attaching means for attaching said compensating spring means and being spaced different distances from said axis so that said second compensating moment can be varied by attaching said compensating spring means to different attaching means.

4. Operating arrangement as claimed in claim 1 wherein one end of said compensating spring means is attached to said connecting means; and comprising a plurality of attaching means for attaching the other end of said compensating spring means spaced different distances from said connecting means whereby said second turning moment is adjusted.

5. Operating arrangement as claimed in claim 1 and including means for adjusting said compensating spring means for varying said second turning moment; and wherein said compensating spring means is a coil spring.

6. Operating arrangement as claimed in claim 1 and comprising a power reducing and motion increasing transmission between said connecting means and said stepped member so that said abutment faces turn through a smaller angle than said stepped member.

7. Operating arrangement as claimed in claim 6 wherein said connecting means included an angular lever having a long arm formed with said abutment faces and a short arm to which said compensating spring means is attached; and wherein said transmission includes a link pivotally connected with said short arm, and a pivotally mounted gear segment pivotally connected with said link; and wherein said stepped member is mounted for turning movement and has a gear segment portion meshing with said gear segment.

8. Operating arrangement as claimed in claim 7 comprising a shaft rotatably supporting said counter means, said cam means, and said stepped member.

9. Operating arrangement as claimed in claim 1 wherein said connecting means has a face adjacent said abutment faces slidingly engaged by a portion of said actuating means is one displaced position and extending in the direction of the movement of said portion of said actuating means.

10. Operating arrangement as claimed in claim 1 wherein said device includes a valve; wherein said operating member is a valve member for opening and closing said valve; wherein said spring urges said valve member to a position closing said valve; and wherein said actuating means includes a manually operated lever connected with said valve member for moving the same, said lever having a stud portion cooperating with said abutment faces.

References Cited
UNITED STATES PATENTS

| | | | |
|---|---|---|---|
| 2,116,785 | 5/1938 | Griffith | 222—15 |
| 2,527,703 | 10/1950 | Carbonaro | 222—20 |
| 2,533,319 | 12/1950 | Hazard | 222—20 |
| 2,818,198 | 12/1957 | Batchelder et al. | 222—20 |
| 3,453,420 | 7/1969 | Freese et al. | 235—132 |

STEPHEN J. TOMSKY, Primary Examiner

U.S. Cl. X.R.

235—132